United States Patent
Coffland

(10) Patent No.: US 7,035,479 B2
(45) Date of Patent: Apr. 25, 2006

(54) GRADED ZOOMING

(75) Inventor: Douglas R. Coffland, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 644 days.

(21) Appl. No.: 10/080,763

(22) Filed: Feb. 22, 2002

(65) Prior Publication Data

US 2003/0161551 A1    Aug. 28, 2003

(51) Int. Cl.
*G06K 9/32* (2006.01)

(52) U.S. Cl. .................... 382/298; 382/300; 345/668; 348/561; 348/581

(58) Field of Classification Search ........ 382/298–300; 345/668–671; 348/561, 581; 353/70; 358/451; 453/70

See application file for complete search history.

(56) References Cited

U.S. PATENT DOCUMENTS

| 6,201,574 B1 | 3/2001 | Martin |
| 6,271,752 B1 * | 8/2001 | Vaios ......................... 340/541 |
| 6,285,803 B1 | 9/2001 | Couwenberg et al. |
| 6,320,979 B1 * | 11/2001 | Melen ........................ 382/154 |
| 6,323,897 B1 | 11/2001 | Kogane et al. |
| 6,332,044 B1 | 12/2001 | Loce et al. |
| 6,339,434 B1 * | 1/2002 | West et al. ................. 345/667 |
| 6,919,921 B1 * | 7/2005 | Morota et al. .......... 348/211.11 |

FOREIGN PATENT DOCUMENTS

WO    WO 01/09836 A1    2/2001

* cited by examiner

Primary Examiner—Bhavesh M. Mehta
Assistant Examiner—Yubin Hung
(74) Attorney, Agent, or Firm—Eddie E. Scott; Alan H. Thompson

(57) ABSTRACT

A system for increasing the resolution in the far field resolution of video or still frame images, while maintaining full coverage in the near field. The system includes a camera connected to a computer. The computer applies a specific zooming scale factor to each of line of pixels and continuously increases the scale factor of the line of pixels from the bottom to the top to capture the scene in the near field, yet maintain resolution in the scene in the far field.

23 Claims, 2 Drawing Sheets

GRADED ZOOMING

GRADED ZOOMING

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to image enhancement and more particularly to graded zooming.

2. State of Technology

U.S. Pat. No. 6,201,574 to H. Lee Martin, patented Mar. 13, 2001, shows a motionless camera orientation system distortion correcting sensing element. Camera viewing systems are utilized in abundance for surveillance, inspection, security, and remote sensing. Remote viewing is critical for robotic manipulation tasks. Close viewing is necessary for detailed manipulation tasks while wide-angle viewing aids positioning of the robotic system to avoid collisions with the workspace. The majority of these systems use either a fixed-mount camera with a limited viewing field, or they utilize mechanical pan-and-tilt platforms and mechanized zoom lenses to orient the camera and magnify its image. In the applications where orientation of the camera and magnification of its image are required, the mechanical solution is large and can subtend a significant volume making the viewing system difficult to conceal or use in close quarters. Several cameras are usually necessary to provide wide-angle viewing of the workspace. In order to provide a maximum amount of viewing coverage or subtended angle, mechanical pan/tilt mechanisms usually use motorized drives and gear mechanisms to manipulate the vertical and horizontal orientation. An example of such a device is shown in U.S. Pat. No. 4,728,839 issued to J. B. Coughlan, et al., on Mar. 1, 1988. Collisions with the working environment caused by these mechanical pan/tilt orientation mechanisms can damage both the camera and the worksite and impede the remote handling operation. Simultaneously, viewing in said remote environments is extremely important to the performance of in-on and manipulation activities. Camera viewing systems that use internal optics to provide wide viewing angles have also been developed in order to minimize the size and volume of the camera and the intrusion into the viewing area. These systems rely on the movement of either a mirror or prism to change the tilt-angle of orientation and provide mechanical rotation of the entire camera to change the pitch angle of orientation. Using this means, the size of the camera orientation system can be minimized, but "blind spots" in the center of the view result Also, these systems typically have no means of magnifying the image and or producing multiple images from a single camera.

U.S. Pat. No. 6,320,979 to Roger D. Melen, patented Nov. 20, 2001 shows depth of field enhancement. Depth of field is a measurement of the range of depth along a view axis corresponding to the in-focus portion of a three dimensional scene being imaged to an image plane by a lens system. Several parameters of a lens system influence the depth of field of that lens system. In general, optical systems with high magnification, such as microscopes, have small depths of field. Also, optical systems which use large aperture lens systems to capture more light generally have small depths of field. In some situations it is desirable to have the benefits of a larger depth of field without giving up those optical qualities which generally result in small depths of field. For example, some analyses of microscopic specimens would be aided by the availability of a high magnification microscope with a relatively large depth of field. Such a microscope could be used to more clearly image the full structure of a microscopic object which is three dimensional in nature. Ordinary microscopes generally allow the clear viewing of a thin section of such a three dimensional specimen, due to the small depth of field of those microscopes. Portions of the specimen which are on either side of the in-focus section will be out of focus, and will appear blurry. The ability to clearly see the full three dimensional structure of a specimen would aid in the understanding of the structure of that specimen. This would be especially useful when used in conjunction with biojective microscopes which allow a user to view a specimen stereoscopically. Another situation in which a small depth of field can pose problems is the low light photography of a scene with large depth variations. An example of this is a landscape scene including foreground objects photographed at night. In order to get sufficient light onto the film at the image plane of the camera, a large aperture lens must generally be used. A large aperture lens, however, will result in a relatively small depth of field. Because of the small depth of field, only a portion of the scene being photographed will be in focus. A conventional method of imaging the depth information of a three dimensional microscopic scene is confocal microscopy. In confocal microscopy a single photodetector is situated behind a pinhole in an opaque screen. An objective lens focuses light from an illuminated point onto the pinhole, and the screen masks out any non-focused light. The illuminated point is generally illuminated by an intense, focused light source, such as a laser. The illuminating light source and the pinhole must be scanned over a microscopic specimen, either one point at a time or in a series of lines, in order to build up information for the whole region of interest. Depth information can be extracted from the data recorded by the photodetector. The information obtained from a confocal microscope can be used to image the three dimensional structure of microscopic specimens, but such a system is too complex and expensive for typical microscopy. Also, confocal microscopy is limited to situations in which microscopic specimens are being imaged, and is not practical for imaging macroscopic scenes. What is needed is a system capable of producing an image of a three dimensional scene with enhanced focus over a large depth of field, without sacrificing optical qualities which ordinarily require a small depth of field.

U.S. Pat. No. 6,332,044 to Robert P. Loce and Michael Branciforte, patented Dec. 18, 2001, shows a system and method for enhancement of image contour fidelity. The invention relates generally to hierarchically organized filters for processing digital images, and more particularly to the use of hierarchically organized template-matching filters to accomplish the resolution enhancement in a cost and computationally efficient manner.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for balancing resolution of a scene having a bottom and a top and a near field and a far field. The scene is represented by a plurality of lines of pixels that capture the scene's near field and maintains resolution in the scene's far field. A specific zooming scale factor is applied to each of the lines of pixels. The scale factor is increased from the bottom to the top to capture the scene in the near field, yet maintain resolution in the scene in the far field.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
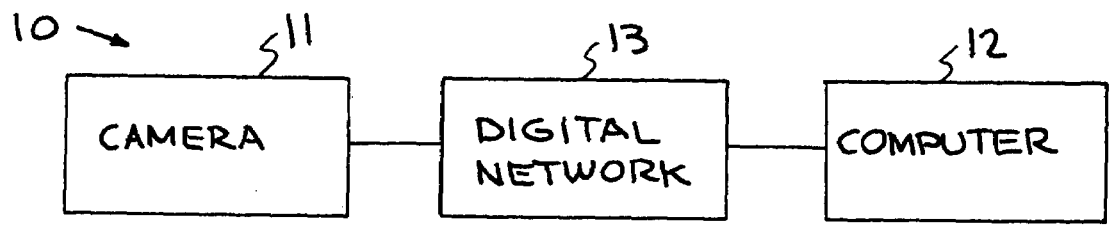
FIG. 1 illustrates an embodiment of the present invention.

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

An embodiment of a system constructed in accordance with the present invention is illustrated in FIG. 1. The system is designated generally by the reference numeral 10. The system 10 is a surveillance system that includes a surveillance camera 11 connected to a digital network 13. The camera 11 is a digital camera interconnected via the digital network 13. The digital network 13 includes or is connected to a computer 12. The computer 12 is a device capable of performing a series of arithmetic or logical operations. Computer may be general purpose computer or a microprocessor that forms a part of the overall system. The computer 12 is a general purpose computer.

Security surveillance systems usually provide views over well-defined areas. The surveillance activity outside of the defined security area is of little interest, while the activity inside the defined area can be of critical importance. Unfortunately, camera views are rarely a good fit for covering the defined area. When, the cameras don't fit the defined area, the solution is usually to add more cameras. This can be extremely expensive, because it usually means adding infrastructure such as cable plant, poles, distribution networks, and the cameras themselves.

Surveillance cameras are most often mounted such that the view "looks" across the area (parallel to the ground) rather than directly down on the area. With cameras looking across an area, the objects in the near field naturally appear larger than objects in the far field. As such, a typical camera view, as seen on a video monitor, has the closest view and best resolution at the bottom and the farthest view, and lowest resolution at the top.

Cameras must be "zoomed out" in order to ensure that important items in the near field are captured. This results in views in the far field being much wider than desirable and causes the resolution in the far field to be much lower than desirable. Cameras are usually adjusted such that the coverage in the near field is complete, and such that the resolution in the far field is sufficient for an assessment. When these two opposing criteria cannot be met, additional cameras are required.

The system 10 provides balances the resolution within a video scene or still image, thereby allowing the camera 11 to capture the full scene in the near field, yet maintain resolution in the far field. While this may be possible through specially built lenses, the system 10 utilizes digital images captured through conventional lenses and can be accomplished at a very low cost.

Using digital frames, the system 10 applies a specific scale factor to each horizontal line of pixels. The system 10 uses graded zooming, continuously increasing the scale factor from bottom to top, causing figures in the far field to appear much closer. The large pixel arrays currently available through digital photography and video make oversampling possible with no visible scene degradation.

The number of pixels used in each horizontal line of pixels is constant, however the graded zooming continuously increases the scale factor from bottom to top according to a scale factor. For instance, if the view at the top of a sample picture has an increasing scale factor of that of the bottom of the sample picture, the bottom line remains the same, while the top line is stretched.

In system 10, each successive line from bottom to top is over-sampled by the following equation:

$$S=1+(Zt-Zb)(N-n)/N$$

Where S is the rate of over-sampling, N is the number of horizontal lines of pixels, n is the horizontal line of pixels number counting from bottom to top, Zt is the zoom ratio at the top of the sample picture, and Zb is the zoom ratio at the bottom of the sample picture.

The system 10 is illustrated utilizing zooming in one dimension only. It is to be understood that zooming in other dimensions is available and is included in other embodiments. Referring again to FIG. 1, the figure will be used to describe another embodiment of a system constructed in accordance with the present invention. Pictures are two-dimensional and simply applying Equation 1 to the horizontal lines would result in images that appear stretched horizontally. In this embodiment a similar equation is applied in the vertical dimension resulting in images with correct aspect ratios. Each successive line from side to side is over-sampled by the following equation:

$$S=1+(Zt-Zb)(N-n)/N \quad \text{(Equation 1)}$$

Where S is the rate of over-sampling, N is the number of vertical lines of pixels, n is the vertical line of pixels number counting from one side to the other side, Zt is the zoom ratio at the one side of the sample picture, and Zb is the zoom ratio at the other side of the sample picture. Applying Equation 1 in the vertical direction results in images that appear stretched vertically.

Figure 2:
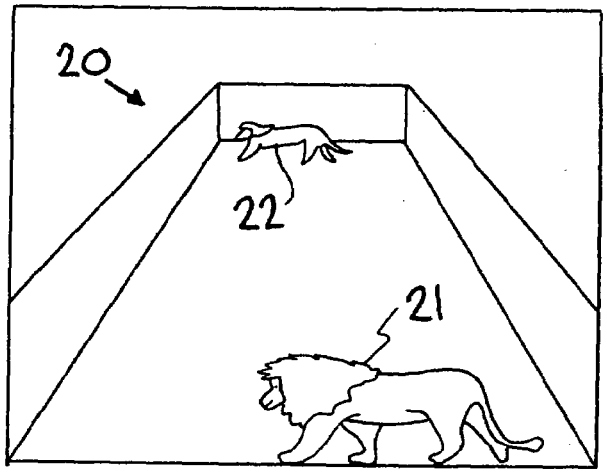
FIG. 2 shows a scene in the normal view.
Figure 3:
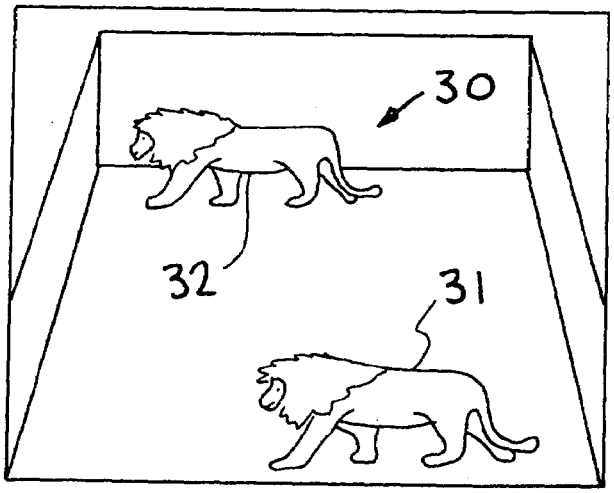
FIG. 3 shows the scene shown in FIG. 2 as seen through graded zooming.

Referring now to FIGS. 2 and 3, another embodiment of a system utilizing the present invention is illustrated. The scene in FIG. 2 is generally designated by the reference numeral 20. The scene in FIG. 3 is generally designated by the reference numeral 30. The system of the embodiment illustrated by FIGS. 2 and 3 provides the ability to increase the resolution in the far field resolution of video or still frame images, while maintaining full coverage in the near field.

A typical camera view, as seen on a video monitor, has the closest view and best resolution at the bottom and the farthest view, and lowest resolution at the top. Cameras must be "zoomed out" in order to ensure that important items in the near field are captured. This results in views in the far field being much wider than necessary and therefore causes the resolution in the far field to be much lower. Cameras are usually adjusted such that the coverage in the near field is complete, and such that the resolution in the far field is sufficient for an assessment. When these two opposing criteria cannot be met, additional cameras are required.

The system of the embodiment of the present invention illustrated in FIGS. 2 and 3 balances the resolution within a video scene or still image, thereby allowing the camera to capture the full scene in the near field, yet maintain resolution in the far field. This system can be used in any situation where maximum resolution is required over a large viewing area, and the resulting picture distortion is acceptable. This system has its most effective implementation in digital image capturing.

Referring again to FIGS. 2 and 3, the system provides a means of equalizing far field and near field resolution in video scenes and still images. This is done by providing a wide view angle in the near field and a narrow view angle in the far field, and by continuously reducing the view angle between the near field and the far field within a single frame. FIG. 2 shows a scene 20 in the normal view. FIG. 3 shows a scene 30, which is the same as the scene 20; however the scene 30 is as seen through graded zooming.

While this may be possible through specially built lenses, this embodiment of the present invention relies on digital images captured through conventional lenses and can be accomplished at a very low cost. Using digital frames, this embodiment of the present invention applies a specific zooming scale factor to each horizontal line of pixels.

Two lions 21 and 22 are shown in FIG. 2. The lions 21 and 22 are actually the same size; however, as seen in the normal view of FIG. 2 the lion 22 appears to be smaller. The camera taking the normal view of FIG. 2 is mounted such that the view "looks" across the area, parallel to the ground. With the camera looking across an area, the lion 21 in the near field appears larger than the lion 22 in the far field. As such, a typical camera view, as seen on a video monitor, has the closest view and best resolution at the bottom and the farthest view, and lowest resolution at the top.

The scene 30 in FIG. 3 show how continuously increasing the scale factor from bottom to top causes the lion 32 in the far field to appear much closer when using graded zooming. The large pixel arrays currently available through digital photography and video make over-sampling possible with no visible scene degradation.

This embodiment of the present invention can be best demonstrated zooming in one dimension only. The number of pixels used in each horizontal line of pixels is constant; however, the rate of over-sampling of pixels is reduced from bottom to top according to the scale factor. For instance, if the view at the top of the picture is zoomed to 2× of that of the bottom of the picture, the bottom line is over-sampled at a rate of 2, while the top line is not over-sampled at all. In one possible implementation, each successive line from bottom to top is over-sampled by Equation 1 which is repeated below:

$$S=1+(Zt-Zb)(N-n)/N \quad \text{(Equation 1)}$$

Where S is the rate of over-sampling, N is the number of horizontal lines, n is the horizontal line number counting from bottom to top, Zt is the zoom ratio at the top of the picture, and Zb is the zoom ratio at the bottom of the picture. Pictures, however, are two-dimensional and simply applying Equation 1 to the horizontal lines would result in images that appear stretched horizontally. Applying a similar equation in the vertical dimension results images with correct aspect ratios. Applying Equation 1 in the vertical direction results in images that appear stretched vertically.

Figure 4:
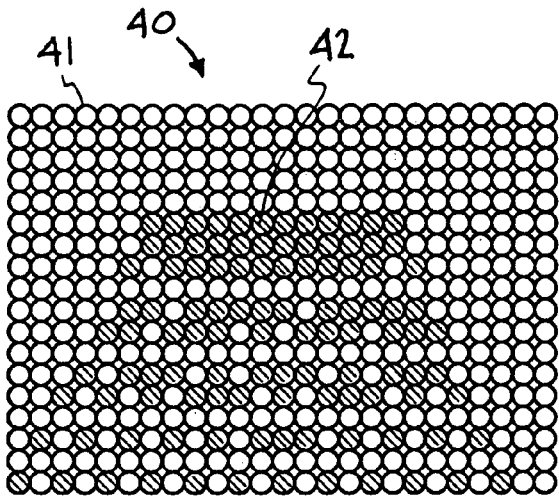
FIG. 4 illustrates how continuously increasing a scale factor from bottom to top can isolate a set of pixels.
Figure 5:
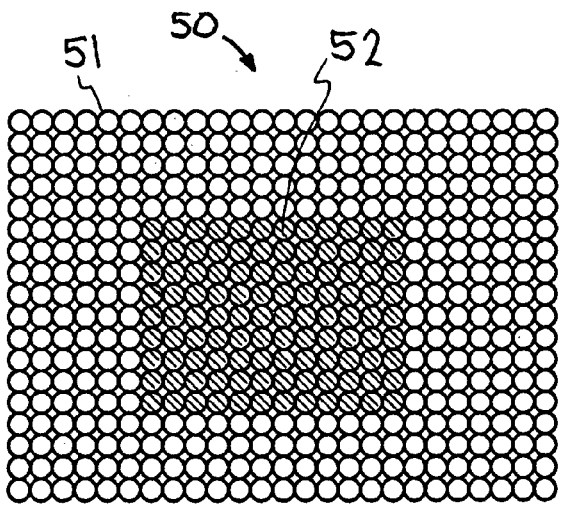
FIG. 5 illustrates that if the set of pixels shown in FIG. 4 are removed, a new pixel map is produced representing graded zooming.

Referring now to FIGS. 4 and 5, another embodiment of the present invention is illustrated. A pixel map is show in FIG. 4 and generally designated by the reference numeral 40. The pixel map 40 includes the lighter colored pixels 41 and the darker colored pixels 42. A pixel map is show in FIG. 5 and generally designated by the reference numeral 50. The pixel map 50 includes the lighter colored pixels 51 and the darker colored pixels 52.

The pixel maps 40 and 50, in FIGS. 4 and 5, explain how pixels might be sampled if they are over-sampled using graded zooming. The same view is present in both pixel map 40 and pixel map 50. FIG. 4 illustrates how continuously increasing a scale factor from bottom to top can stretch the set of darker colored pixels 42. If the lighter colored pixels 41 are then reduce from the pixel map 40, leaving the stretched set of darker colored pixels 42, a new pixel map can be produced. The new pixel map is represented by the pixel map 50 shown in FIG. 5.

The pixel map 50 of FIG. 5 includes a scene 52 represented by the darker colored pixels 52. Graded zooming causes the top portion of the scene represented by pixels 52 in the far field to appear much closer. The number of pixels used in each horizontal line of pixels is constant, however the rate of over-sampling of pixels is reduced from bottom to top according to the scale factor. For instance, if the view at the top of the picture is zoomed to 2× of that of the bottom of the picture, the bottom line is over-sampled at a rate of 2, while the top line is not over-sampled at all. In one possible implementation, each successive line from bottom to top is over-sampled by the following equation:

$$S=1+(Zt-Zb)(N-n)/N$$

Where S is the rate of over-sampling, N is the number of horizontal lines, n is the horizontal line number counting from bottom to top, Zt is the zoom ratio at the top of the picture, and Zb is the zoom ratio at the bottom of the picture.

Pictures, however, are two-dimensional and simply applying Equation 1 to the horizontal lines would result in images that appear stretched horizontally. Applying a similar equation in the vertical dimension results images with correct aspect ratios. Applying Equation 1 in the vertical direction results in skipping lines.

Figure 6:
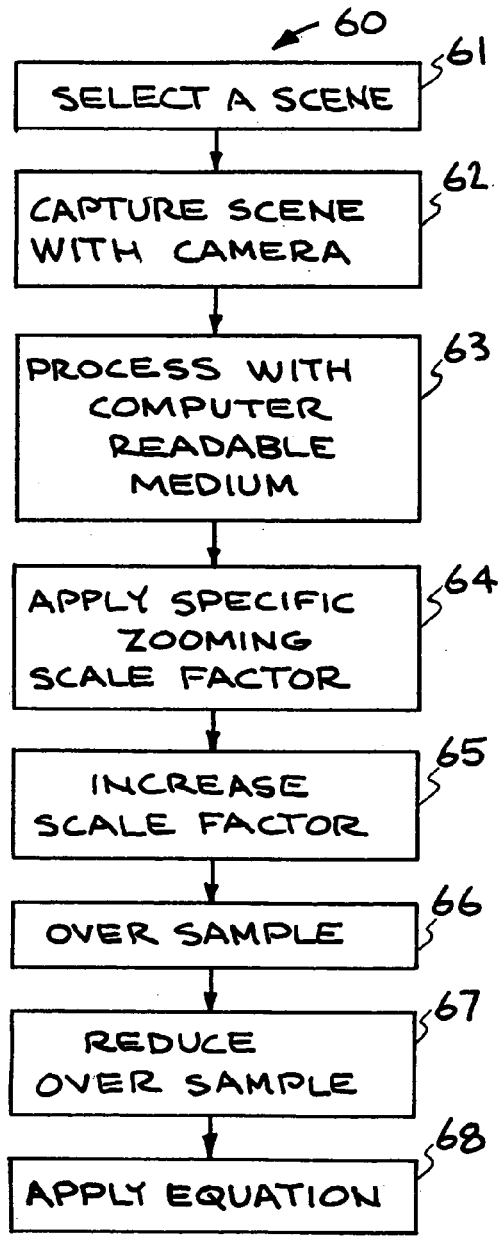
FIG. 6 is a flow chart that illustrates another embodiment of the present invention.

Another embodiment of a system constructed in accordance with the present invention is illustrated in FIG. 6. The system is designated generally by the reference numeral 60. The system 60 includes: a scene 61 having a bottom, a top, a near field, a far field, and a plurality horizontal lines of pixels that captures the scene's near field and maintains resolution in the scene's far field. The scene is captured by a camera 62. The system 60 includes a computer-readable medium 63. The computer-readable medium 63 includes a Windows NT 4.0 personal computer interconnected with a 100 Mbps local area network. A specific zooming scale factor 64 is applied to each of the horizontal line of pixels. The system operates by continuously increasing the scale factor of the horizontal line of pixels from the bottom to the top to capture the scene in the near field, yet maintaining resolution in the scene in the far field as illustrated by block 65. The pixels in the lines of pixels are over-sampled as illustrated by block 66. The lines of pixels are over-sampled using graded zooming in a horizontal and a vertical direction. The number of the pixels used in the horizontal line of the pixels is constant, however the rate of over-sampling of the pixels is reduced from the bottom to the top according to a scale factor wherein the horizontal line of the pixels at the top of the scene is zoomed to 2× of that of the horizontal line of the pixels at the bottom of the scene and the bottom line is over-sampled at a rate of 2, while the top line is not over-sampled at all. This is represented by block 67.

A computer program utilizes equation 68 as follows:

$$S=1+(Zt-Zb)(N-n)/N$$

where S is the rate of the over-sampling, N is the number of the plurality horizontal lines, n is the horizontal line number counting from the bottom to the top, Zt is the zoom ratio at the top of the scene, and Zb is the zoom ratio at the bottom of the scene.

The system 60 balances the resolution within a video scene or still image, thereby allowing the camera 62 to capture the full scene 61 in the near field, yet maintain resolution in the far field. Using digital frames, the system 60 applies a specific zooming scale factor 64 to each horizontal line of pixels. The system 60 continuously increases the scale factor from bottom to top 65 causing figures in the far field to appear much closer when using graded zooming. The number of pixels used in each horizontal line of pixels is constant, however the rate of over-sampling 66 of pixels is reduced from bottom to top according to a scale factor. For instance, if the view at the top of a sample picture is zoomed to 2× of that of the bottom of the scene 61, the bottom line is over-sampled at a rate of 2, while the top line is not over-sampled at all.

Each successive line from bottom to top is over-sampled by the equation 68:

$$S=1+(Zt-Zb)(N-n)/N$$

Where S is the rate of over-sampling, N is the number of horizontal lines of pixels, n is the horizontal line of pixels number counting from bottom to top, Zt is the zoom ratio at the top of the sample picture, and Zb is the zoom ratio at the bottom of the scene 61. A similar equation is applied in the vertical dimension results images with correct aspect ratios. Applying Equation 68 in the vertical direction results in skipping lines.

The invention illustrated in the various embodiments can be used in any situation where maximum resolution is required over a large viewing area, and the resulting picture distortion is acceptable. It is expected that all Government security surveillance will ultimately be performed using digital cameras interconnected via digital networks. Most existing surveillance systems suffer from reduced resolution in the far field. As such, most government security surveillance systems can benefit from this application. Other uses of the invention illustrated in the various embodiments include face recognition, biojective microscopes, machine vision, and any other use wherein object recognition in the far field of view of the picture image would be useful.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A surveillance system for providing a view of a scene under surveillance, wherein said scene has a bottom and a top and a near field and a far field, said scene represented by a plurality of lines of pixels, comprising:
   a digital network,
   a digital camera connected to said digital network, said digital camera capturing said view of said scene under surveillance and representing said scene under surveillance by said plurality of lines of pixels, and
   a computer connected to said digital network, wherein said computer applies a specific zooming scale factor to each of said horizontal line of pixels and continuously increases the scale factor of said horizontal line of pixels from said bottom to said top to capture said scene in said near field, yet maintain resolution in said scene in said far field resulting in any distortion in said view being reduced; wherein said lines of pixels are horizontal lines of pixels and said computer contains a computer program that applies a specific zooming scale factor to each of said horizontal lines of pixels and continuously increases the scale factor of said horizontal lines of pixels from said bottom to said top to capture said scene in said near field, yet maintain resolution in said scene in said far field; wherein said lines of pixels are over-sampled; and wherein said computer contains a computer program that utilizes the equation:

$$S=1+(Zt-Zb)(N-n)/N$$

where S is the rate of said over-sampling, N is the number of said plurality of lines of pixels, n is the horizontal line number counting from said bottom to said top, Zt is the zoom ratio at said top of said scene, and Zb is the zoom ratio at said bottom of said scene.

2. The system of claim 1 wherein said camera is a surveillance camera.

3. The system of claim 1 wherein said camera is a video surveillance camera.

4. The system of claim 1 wherein said digital camera and said computer are interconnected via said digital network, wherein images in said near field are at said bottom, wherein images in said far field are at said top, and wherein said computer applies said specific zooming scale factor to each of said horizontal line of pixels and continuously increases the scale factor of said horizontal line of pixels from said bottom to said top to capture said scene in said near field, yet maintain resolution in said scene in said far field resulting in any distortion in said view being reduced and said images in said images in said far field are enlarged.

5. The system of claim 1 wherein said camera is a still camera.

6. The system of claim 1 wherein said computer is a digital computer.

7. The system of claim 1 wherein said computer is a general purpose computer.

8. The system of claim 1 wherein said computer is connected to said digital camera by said digital network, wherein images in said near field are at said bottom, wherein images in said far field are at said top, and wherein said computer applies said specific zooming scale factor to each of said horizontal line of pixels and continuously increases the scale factor of said horizontal line of pixels from said bottom to said top to capture said scene in said near field, yet maintain resolution in said scene in said far field resulting in any distortion in said view being reduced and resulting in said images in said far field being enlarged.

9. The system of claim 1 wherein said horizontal lines of pixels form a digital image.

10. The system of claim 1 wherein said horizontal lines of pixels are photographic images.

11. The system of claim 1 including pixels in said lines of pixels and wherein said lines of pixels are over-sampled using graded zooming in a horizontal and a vertical direction.

12. The system of claim 11 wherein the number of said pixels used in said horizontal line of pixels is constant, however the rate of over-sampling of said pixels is reduced from said bottom to said top according to a scale factor wherein said horizontal line of said pixels at said top of said scene is zoomed to 2× of that of said horizontal line of said pixels at said bottom of said scene.

13. The system of claim 11 wherein the number of said pixels used in said horizontal line of said pixels is constant, however the rate of over-sampling of said pixels is reduced from said bottom to said top according to a scale factor wherein said horizontal line of said pixels at said top of said scene is zoomed to 2× of that of said horizontal line of said pixels at said bottom of said scene and said bottom line is over-sampled at a rate of 2, while said top line is not over-sampled at all.

14. A surveillance system for providing a view of a scene under surveillance, wherein said scene has a bottom and a top and a near field and a far field, said scene represented by a plurality of lines of pixels, comprising:
  a digital network,
  a digital camera connected to said digital network, said digital camera capturing said view of said scene under surveillance and representing said scene under surveillance by said plurality of lines of pixels, and
  a computer-readable medium connected to said digital network, wherein said computer applies a specific zooming scale factor to each of said lines of pixels and continuously increases the scale factor of said lines of pixels from said bottom to said top to capture said scene in said near field, yet maintain resolution in said scene in said far field resulting in any distortion in said view being reduced; wherein said lines of pixels are horizontal lines of pixels and said computer-readable medium is operatively connected to a computer program that applies a specific zooming scale factor to each of said horizontal lines of pixels and continuously increases the scale factor of said horizontal lines of pixels from said bottom to said top to capture said scene in said near field, yet maintain resolution in said scene in said far field; and wherein said computer contains a computer program that utilizes the equation:

$$S=1+(Zt-Zb)(N-n)/N$$

where S is the rate of said over-sampling, N is the number of said plurality of lines of pixels, n is the horizontal line number counting from said bottom to said top, Zt is the zoom ratio at said top of said scene, and Zb is the zoom ratio at said bottom of said scene.

15. The system of claim 14 wherein said horizontal lines of pixels form a digital image.

16. The system of claim 14 wherein said horizontal lines of pixels form a photographic image.

17. The system of claim 14 wherein said horizontal lines of pixels are over-sampled.

18. A method of surveillance of a scene under surveillance, wherein said scene has a bottom and a top and a near field and a far field, said scene represented by a plurality of lines of pixels, comprising the steps of:
  providing a digital network,
  using a digital camera connected to said digital network to capture said view of said scene under surveillance and to represent said scene under surveillance by said plurality of lines of pixels,
  using a computer connected to said digital network for applying a specific zooming scale factor to each of said lines of pixels, and
  using said computer for continuously increasing the scale factor from said bottom to said top to capture said scene in said near field, yet maintain resolution in said scene in said far field to make any distortion in said view reduced; wherein said step are performed utilizing a computer containing a computer program that applies a specific zooming scale factor to each of said lines of pixels and continuously increases the scale factor of said lines of pixels from said bottom to said top to capture said scene in said near field, yet maintain resolution in said scene in said far field; and wherein said computer program utilizes the equation:

$$S=1+(Zt-Zb)(N-n)/N$$

where S is the rate of over-sampling, N is the number of said plurality horizontal lines, n is the horizontal line number counting from bottom to top, Zt is the zoom ratio at the top of said scene, and Zb is the zoom ratio at the bottom of said scene.

19. The method of claim 18, including the step of over-sampling said lines of pixels.

20. The method of claim 18 wherein pixels are contained in said lines of pixels and including the step of over-sampling said lines of pixels using graded zooming in a horizontal and a vertical direction.

21. The system of claim 20 wherein the number of said pixels used in said line of pixels is constant, however the rate of over-sampling of said pixels is reduced from said bottom to said top according to a scale factor wherein said line of said pixels at said top of said scene is zoomed to 2× of that of said line of said pixels at said bottom of said scene.

22. The method of claim 18 wherein the number of said pixels used in said line of said pixels is constant, however the rate of over-sampling of said pixels is reduced from said bottom to said top according to a scale factor wherein said line of said pixels at said top of said scene is zoomed to 2× of that of said line of said pixels at said bottom of said scene and said bottom line is over-sampled at a rate of 2, while said top line is not over-sampled at all.

23. The method of claim 18, wherein a computer contains a computer program that applies a specific zooming scale factor to each of said horizontal line of pixels and continuously increases the scale factor of said horizontal line of pixels from said bottom to said top to capture said scene in said near field, yet maintain resolution in said scene in said far field.

* * * * *